United States Patent [19]

Dawson, Jr.

[11] 4,180,015
[45] Dec. 25, 1979

[54] FAIL SAFE SUSPENSION POULTRY DRINKER

[76] Inventor: Carl B. Dawson, Jr., 1637 Handley Ave., Winchester, Va. 22601

[21] Appl. No.: 889,504

[22] Filed: Mar. 23, 1978

[51] Int. Cl.² ............................................. A01K 7/04
[52] U.S. Cl. ........................................ 119/78; 119/80
[58] Field of Search ...................... 119/78, 79, 80, 81; 137/409, 426, 428

[56] References Cited

U.S. PATENT DOCUMENTS

| 337,227 | 3/1886 | Barden | 119/78 X |
|---|---|---|---|
| 1,422,986 | 7/1922 | Judy | 119/80 |
| 1,961,092 | 5/1934 | Smith | 119/80 |
| 3,063,417 | 11/1962 | Blosser | 119/79 |
| 3,283,746 | 11/1966 | Rüter | 119/81 |
| 3,324,834 | 6/1967 | McKinstry | 119/81 X |
| 3,450,102 | 6/1969 | Davis et al. | 119/80 |
| 3,450,103 | 6/1969 | Davis | 119/80 |
| 3,610,206 | 10/1971 | Davis | 119/80 X |
| 3,685,495 | 8/1972 | Kantor | 119/81 |
| 3,714,929 | 2/1973 | Boterweg | 119/80 |
| 3,861,358 | 1/1975 | Bowell | 119/79 |

Primary Examiner—Louis G. Mancene
Assistant Examiner—Robert P. Swiatek
Attorney, Agent, or Firm—Steele, Gould & Fried

[57] ABSTRACT

A poultry drinker that may be suspended or supported on the floor. A base member includes an annular drinking trough, a water reservoir providing ballast for the drinker, and a float chamber concentric with the trough and reservoir. A float having a float rod extending upwardly therefrom is mounted in the float chamber, and a valve connected to a source of water is mounted above the float chamber. Water flows from the valve into the reservoir and then spills over into the float chamber until the level of water in the float chamber is sufficient so that the float rod closes the valve. Communication is provided between the float chamber and the trough so that the water level in the float chamber is directly proportional to the water level in the trough.

12 Claims, 4 Drawing Figures

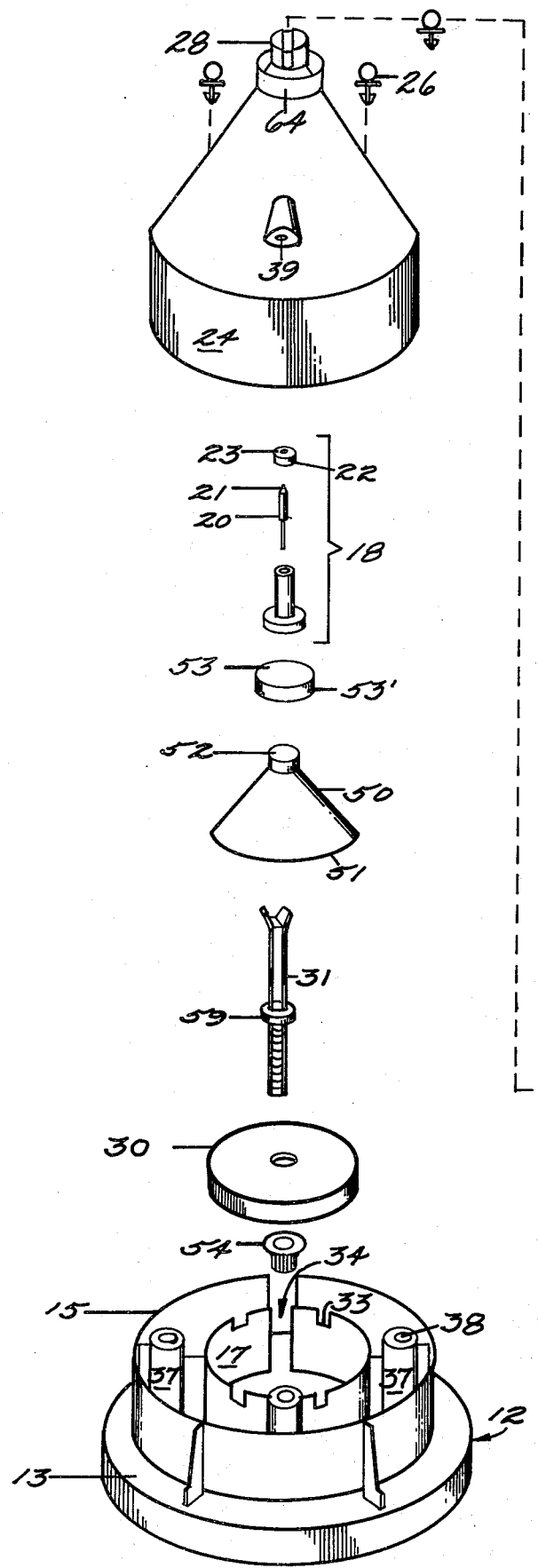
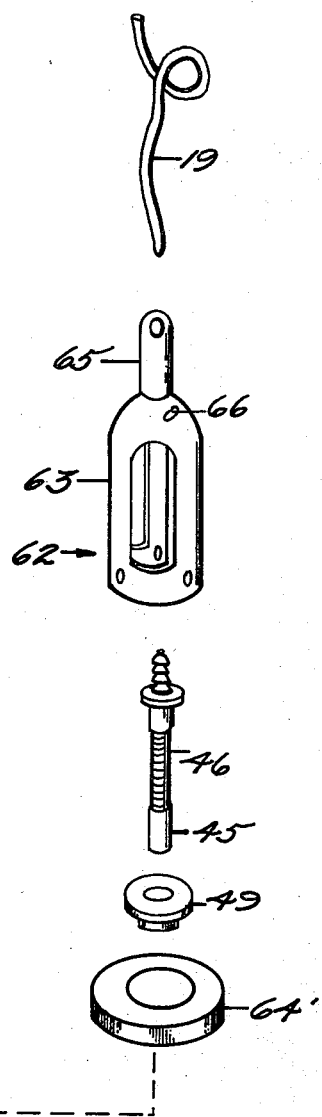
Fig. 2
Fig. 3b
Fig. 3a

FAIL SAFE SUSPENSION POULTRY DRINKER

BACKGROUND AND SUMMARY OF THE INVENTION

There are numerous supension type drinkers in the prior art, such as shown in U.S. Pat. No. 3,283,746. While such suspension type drinkers have wide utility, should they be adjusted so that the drinker inadvertently touches the ground, the spring-operated valve mechanism will cease to function properly, and the drinker will overflow. This situation has been avoided in the structure shown in U.S. Pat. No. 3,685,495; however, that structure also has disadvantages in that it utilizes a spring-balance type of water valve which consists of many small precision threaded components, and utilizes a separate ballast container that must be filled and separately attached to the device before the device is useful to accomplish its intended function. There have also been proposals for float actuated drinkers, such as shown in U.S. Pat. Nos. 3,610,206 and 1,961,102, and while these drinkers also have good utility, they are either adapted to only remain on the ground or there may be excessive swinging thereof when suspended due to insufficient ballast.

According to the present invention, a poultry drinker is provided that may be either suspended or supported on the floor, contains sufficient ballast to minimize swinging when suspended or lateral displacement when resting on the floor, and which does not need any precision threaded components, nor require the filling of a ballast container that is distinct from the other components of the assembly and requiring separate attachment thereof to the other components. The drinker, according to the invention, includes a base member having an annular drinking trough around the periphery thereof, the base member comprising means for providing ballast to minimize movement of the drinker, and the ballast providing means defining a water reservoir. Since the water in the reservoir is constantly changing it never becomes stale. The base member further comprises means defining a float chamber, the float chamber being concentric with the annular trough, and the reservoir generally concentric with the float chamber and the trough. A valve is connected up to a source of water, and means are provided for supporting the valve so that the valve is in water communication with the reservoir. A float with a float rod operatively connected thereto is disposed in the float chamber, the rod extending upwardly from the chamber toward the valve, and there are means for providing communication between the top portion of the reservoir and the float chamber so that after water from the valve reaches a predetermined level in the reservoir, it will overflow into the float chamber, and means for providing water communication between the float chamber and the trough so that the water level in the float chamber is directly proportional to the water level in the trough. Preferably, the valve supporting means comprises means for supporting the valve above the reservoir, including a generally bell-shaped shell member, means for readily detachably connecting the shell member to the base member, and means for adjustably supporting the valve with respect to the shell member, the reservoir having an open top in communication with the valve. Connection between the shell member and the base may be provided by a plurality of simple key members, and the float may be releasably attached to the float rod with a simple clip.

It is the primary object of the present invention to provide a versatile, inexpensive, easy to manufacture and simple poultry drinker. This and other objects of the invention will become clear from an inspection of the detailed description of the invention, and from the appended claims.

BRIEF DESCRIPTION OF THE DRAWINGS

FIG. 2 is an exploded view of the drinker of FIG. 1;

FIGS. 3a and 3b are side and top views respectively of an exemplary clip for attaching a float member to the rod, according to the present invention.

DETAILED DESCRIPTION OF THE DRAWINGS

Figure 1:
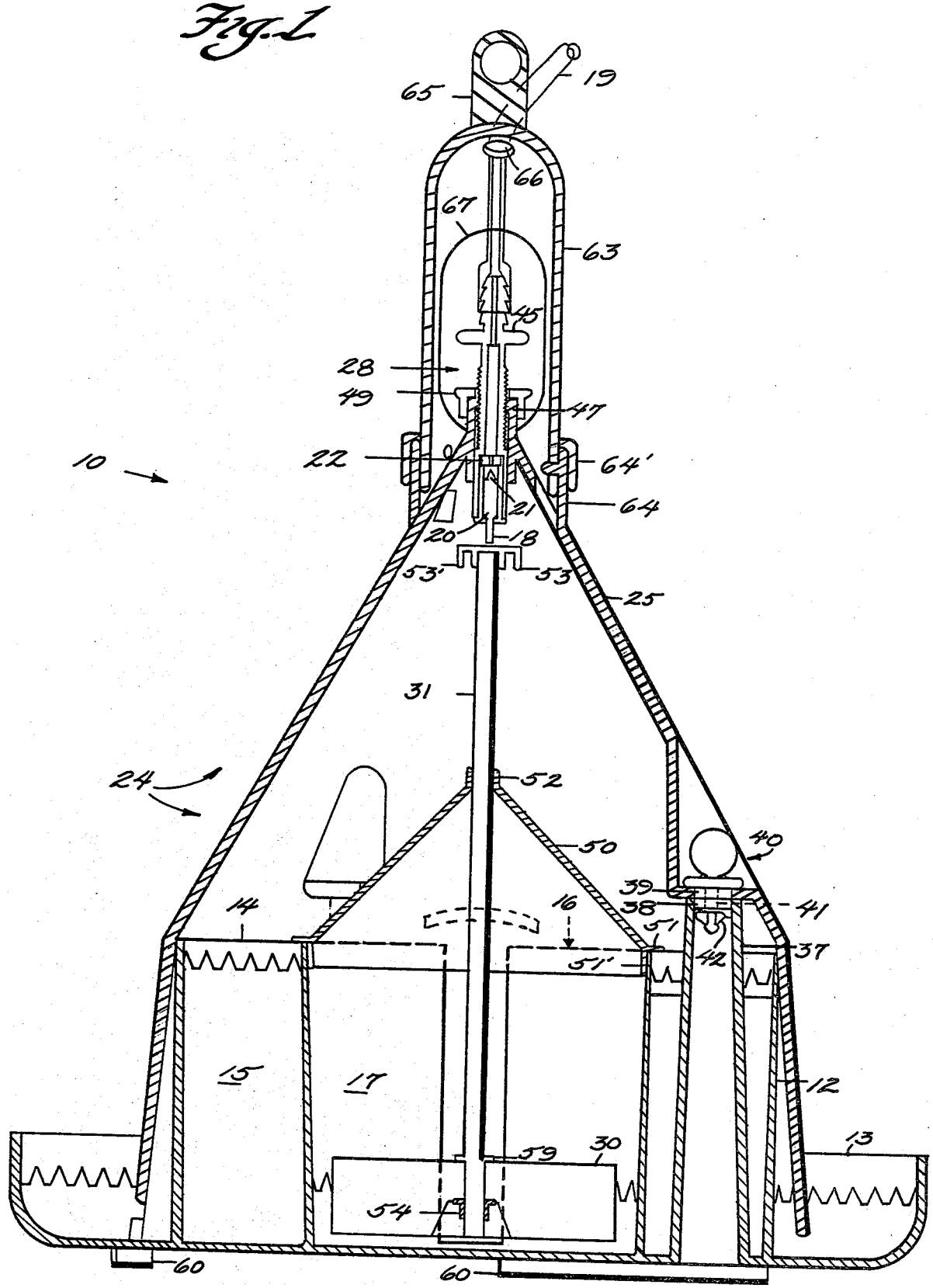
FIG. 1 is a side cross-sectional view of an exemplary drinker according to the invention.

An exemplary poultry drinker, according to the present invention, which may be suspended or supported on the floor is illustrated generally at 10 in the drawings. The drinker 10 includes a base member 12 including an annular drinking trough 13 around the periphery thereof. The member 12 includes means 14 for providing ballast to minimize movement of the drinker, whether suspended or floor supported, the means 14 comprising means defining a water reservoir 15. The member 12 further includes means 16 defining a float chamber 17, the float chamber concentric with the annular trough 13, and the reservoir 15 generally concentric with the float chamber 17 and trough 13, and for convenience preferably disposed between the float chamber 17 and trough 13.

A valve means 18 is operatively connected up (as by the connecting hose 19) to a source of water, the valve preferably being a normally open valve that is closed when the actuator 20 thereof is moved upwardly so that the tapered end 21 closes off the opening 22 in rubber washer 23. Means 24 are provided for supporting the valve 18 so that the valve is in water communication with the reservoir 15. The means 24 preferably comprises means for supporting the valve above the reservoir, and includes a generally bell-shaped shell member 25, with means 26 for readily detachably connecting the shell member 25 to the base member 12, and means 28 for adjustably supporting the valve 18 with respect to the shell member 25, the reservoir having an open top in open communication with the valve 18.

A float 30 of any suitable material is disposed in the float chamber 17, and a float rod 31 is operably connected to the float and extends upwardly from the float 30 toward the valve 18. Means for providing communication between a top portion of the reservoir 15 and the float chamber 17 so that after water from the valve reaches a predetermined level in the reservoir, it will overflow into the float chamber preferably comprises a plurality of cutouts 33 formed in an interior wall of the reservoir 15. Means are also provided for providing water communication between the float chamber 17 and the trough 13 so that the water level in the float chamber is directly proportional to the water level in the trough. Preferably, the reservoir 15 comprises one or more semi-circular shaped chambers (one shown in FIG. 2), and the means for providing communication between the float chamber and the trough comprises means 34 for spacing the ends of the semi-circular shaped chamber of reservoir 15 from each other.

In order that no threaded component parts need be provided, for ease of manufacturing and assembly, the readily detachable connecting means 26 and the adjustable supporting means 28 are preferably formed without threaded members, as illustrated in the drawings. The means 26 comprises a plurality of tubular extensions 37 projecting above the open top of the reservoir 15, and having means defining a key opening 38 (see FIG. 2 in particular) at the top of each of the extensions 37. Means defining a plurality of openings 39 in the side wall portions of the shell member 25 are also provided, and a plurality of key fasteners 40 are provided for cooperation with holes 39, 38, each fastener 40 having a stem portion 41 thereof with lock tabs 42 thereon so that it corresponds in shape to the key opening 38. Upon insertion of the fastener 40 through the opening 39 into the opening 38, with the proper orientation, the member 40 can be twisted so that the tabs 42 engage interior portions of the top of the extensions 37 and hold the shell member 25 to the base member 12.

The adjustable supporting means 28 preferably comprise a valve stem 45 (see FIG. 2), the valve means 18 being press fit into engagement with stem 45, and stem 45 having ratchet surfaces 46 formed on opposite linear surfaces thereof, and pawl means 47 formed on the interior surfaces of a bore in the top of the shell member 25 for cooperating with the ratchet surfaces 46. To adjust the position of the valve 18 from the exterior of the drinker 10, the cap-lock 49 is merely removed, and the stem 45 moved upwardly with respect to the shell member 25, an incremental ratcheting action taking place between the pawl 47 and the ratchet surfaces 46. The ratchet surfaces 46 may be in increments of 1/16 inch to provide very fine adjustment of the position of the valve 18 which, of course, in turn determines the exact level of water in the trough 13.

The drinker 10, according to the invention, also preferably comprises means for preventing direction communication between water from the valve 18 and the float chamber 17 so that water from the valve 18 must enter the float chamber 17 only upon overflowing of the reservoir 15. Such means for preventing direct communication between the valve and the float chamber preferably comprises a generally conical member 50 having a base 51 large enough to cover the float chamber 17, and of the same general shape, and having an opening 52 formed in the tip thereof. A downturned flange 51' of base 51 engages the inside surface of float chamber 17. The float rod 31 passes through the opening 52, the means 50 thus also providing for guidance of the reciprocal up and down movement of the float rod 31. Cap 53 is releasably attached (press fit) onto the top of rod 31, and engages actuator 20 of valve 18 during operation, and deflects incoming water so that it drips off circumferential flange 53' of cap 53 onto conical member 50, preventing any water from running down rod 31 directly to chamber 17.

The float rod is releasably attached to the float 30 by attaching means including a clip 54 (see FIGS. 1, 3a and 3b in particular) having a collar 55, and with an opening 56 therein large enough to receive the float rod 31. Tab means 57 project into the opening 56 (see FIGS. 3a and 3b) for providing an interference with the rod 31 to prevent relative movement between the rod and the clip 54 under normal operating circumstances. The attaching means further may comprise a collar member 59 formed on the rod 31 integral therewith, the float 30 being received between the collar member 59 and the clip collar 55 (see FIG. 1). The float 30 may be made of any suitable buoyant material, or may be a hollow shell.

The drinker 10, according to the invention, may be supported from overhead, like conventional supsension type drinkers, or it may be rested on the ground. Normally, when the chicks are young, the drinker 10 will be placed so that the integral feet 60 (see FIG. 1) thereof rest directly on the ground. As the chicks get older, suspending means 62 will be utilized, the height of the trough 13 off the ground being adjusted depending upon the size of the chickens utilizing it. However, if at any time the drinker should inadvertently engage the ground, there will be no overflow since the drinker 10 is adapted for ground support also.

Suitable suspending means 62, according to the invention, may comprise an elongated generally tubular hanging cap 63 surrounding the valve 18. The cap 63 is generally closed at the top, and open at the bottom, and adapted to fit around and tightly engage an extension collar 64 extending upwardly from the shell member 25. A lock collar 64' over extension collar 64 holds members 63,64 together. An extension with a hole for receipt of a rope or the like, the extension indicated at 65 on FIG. 1, is provided for actually receiving the suspending rope or the like, and an opening 66 is preferably provided in the top of the member 63 to allow passage of the water supply hose 19 therethrough into operative association with the valve 18. Wall surfaces of the structure 63 provide means defining an opening 67 in a side of the cap 63 for providing ready access to the valve to allow adjustment thereof. Thus, while the cap 63 does allow ready adjustment of the valve 18, it also provides protection for the valve.

An exemplary drinker 10 according to the present invention having been described, an exemplary mode of operation thereof will now be set forth.

The float rod 31 is passed through the opening 52 in the conical member 50 and cap 53 is pressed into place on rod 31. Float 30 is disposed on the bottom of the rod 31 and pushed into engagement with the collar member 59, and then clip 54 is pressed onto the bottom of the rod 31, until the collar 55 thereof abuts the bottom of the float 30, the tab means 57 providing a tight interference fit with the rod 31. The conical member 50 is then placed on the top of the float chamber 17, so that the base 51 thereof snuggly engages the top of the chamber 17, and thus the float 30 is disposed in operative relationship in the float chamber 17. The valve stem 45 is then inserted through the opening formed in the top of shell member 25, and ratcheted into place with respect to the pawl means 47 until an initially desirable relative position is achieved, and then the cap-lock 49 is pushed over the pawl means 47 to hold them tightly into place against the linear ratchet surfaces 46 of the valve stem 45. The shell member 25 is then placed over the means 14 defining the reservoir 15 so that the openings 39 in the shell member 25 are in alignment with the openings 38 formed in the tubular extensions 37 of the base member 12. Then the key locking members 40 are oriented so that the tabs 42 thereof are in alignment with the particular shape of the keyed openings 38 in extensions 37, the stems 41 are inserted through the openings 39 and openings 38, and the members 40 twisted about 90 degrees, thereby holding the components 25, 12 together.

Once the drinker 10 is assembled, the hose 19 from the water source is attached up to the valve means 18, and the drinker 10 may be placed directly on the ground, with the legs 60 in engagement with the ground. Whether the drinker 10 is to be ground supported or suspension supported, however, it is desirable to first place the cap 63 over the top of the valve means 18, into engagement with the collar extension 64 of the shell member 25, the lock collar 64' being moved into place to hold the components 63, 64 together. The hose 19 is threaded through the opening 66 before being placed into operative engagement with the valve means 18. If the drinker is then to be suspended, a rope or cable or the like is tied through the opening in the extension 65. To adjust the water level in the trough 13, it is merely necessary to pull up the cap-lock 49, ratchet the valve stem 45 with respect to the pawl means 47 to another position, and place the cap-lock 49 back in place. Water flowing through the hose 19 will pass through the valve means 18, and if the valve means 18 is open, water will drip down off flange 53' onto the top of the conical member 50, and drain off into the reservoir 15. Once the level of water in the reservoir 15 reaches the cutouts 33, it will overflow into the float chamber 17, and from the float chamber 17 will be passed between the reservoir's semi-circular portion ends into the trough 13. As the water in the float chamber 17 rises and falls, it causes the float rod 31 to close and open the valve means 18 respectively.

It will thus be seen that according to the present invention, a poultry drinker has been provided that may be constructed and assembled so that no threaded components are needed, and all of the component parts may be made from plastic—injection molded of plastic, if desired. Assembly and disassembly are quick and easy. The reservoir water never becomes stale, and all water must first enter the reservoir. The drinker can be supported on the ground or suspended, operating as well in either mode, and the level of the water in the trough is easy to ajust from outside the drinker 10 no matter which position the drinker is in. Also, in either position the ballast provided by the water in the reservoir 15 prevents swinging or linear movement of the drinker 10.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A suspension or floor supported poultry drinker comprising a base member including an annular drinking trough around the periphery thereof,
    said base member comprising means providing ballast to minimize movement of the drinker, said ballast providing means defining a water reservoir and said base member further comprising means defining a float chamber, said float chamber concentric with said annular trough, and said reservoir generally concentric with said float chamber and said trough;
    a valve,
    means for connecting said valve to a source of water,
    means for supporting said valve so that said valve is in water communication with said reservoir;
    a float disposed in said float chamber,
    a float rod operatively connected to said float and extending from said float upwardly toward said valve,
    means for providing communication between a top portion of said reservoir and said float chamber so that after water from said valve reaches a predetermined level in said reservoir it will overflow into said float chamber, and
    means for providing water communication between said float chamber and said trough so that the water level in said float chamber is directly proportional to the water level in said trough.

2. A drinker as recited in claim 1 wherein said means for supporting said valve comprises means for supporting said valve above said reservoir, including a generally bell-shaped shell member, means for readily detachably connecting said shell member to said base member, and means for adjustably supporting said valve with respect to said shell member; said reservoir having an open top in open communication with said valve.

3. A drinker as recited in claim 2 wherein said valve includes a valve stem, and wherein said means for adjustably supporting said valve with respect to said shell member comprises ratchet surfaces formed on linear surfaces of said valve stem, and pawl means formed on the interior surfaces of a bore in the top of said shell member.

4. A drinker as recited in claim 2 wherein said means for readily detachably mounting said shell member to said base member comprise a plurality of tubular extensions projecting above the open top of said reservoir and having means defining a key-opening at the top of each of said extensions; means defining a plurality of openings in side wall portions of said shell member; and a plurality of key-fasteners each having stem and tab portions thereof corresponding in shape to the key-opening formed in the extension with which it cooperates.

5. A drinker as recited in claim 1 wherein said means defining said reservoir comprises a semicircular shaped chamber and wherein said means for providing communication between said float chamber and said trough comprises means for spacing the ends of said semicircular shaped chamber from each other.

6. A drinker as recited in claim 1 further comprising means for preventing direct communication between water from said valve and said float chamber so that water from said valve must enter said float chamber upon overflowing of said reservoir.

7. A drinker as recited in claim 6 wherein said means for supporting said valve comprises means for supporting said valve above said reservoir and said chamber, said reservoir having an open top, and wherein said direct communication preventing means comprises a generally conical member having a base large enough to cover said float chamber and having an opening formed in the top thereof, said float rod passing through said opening.

8. A drinker as recited in claim 1 further comprising means for releasably attaching said float to said float rod, said means including a clip having a collar with an opening therein large enough to receive said float rod, and tab means projecting into said opening for providing an interference fit with said rod to prevent relative movement between said rod and said clip under operating circumstances.

9. A drinker as recited in claim 8 wherein said attaching means further comprises a collar member formed on said rod, said float being received between said collar member and said clip collar.

10. A drinker as recited in claim 1 further comprising means for suspending the drinker, including an elongated generally tubular hanging cap surrounding said valve and having means for receiving a suspension component formed in the top thereof, and means defining an opening in a side thereof for providing access to said valve.

11. A drinker as recited in claim 1 further comprising a cap disposed on the end of said float rod adapted to engage said valve for ensuring that water will not travel directly down said float rod.

12. A drinker as recited in claim 11 wherein said float rod cap includes a depending flange, and wherein said float rod cap is removable.

* * * * *